(12) United States Patent
Brown

(10) Patent No.: US 6,443,667 B2
(45) Date of Patent: Sep. 3, 2002

(54) LANDSCAPING TILE

(76) Inventor: Audrey E. Brown, 2516 Penn Ave., Pittsburgh, PA (US) 15222

( * ) Notice: Subject to any disclaimer, the term of this patent is extended or adjusted under 35 U.S.C. 154(b) by 0 days.

(21) Appl. No.: 09/849,997

(22) Filed: May 8, 2001

Related U.S. Application Data

(60) Provisional application No. 60/211,376, filed on Jun. 14, 2000.

(51) Int. Cl.⁷ .......................... E01C 5/18; E01C 11/24; E02D 17/20
(52) U.S. Cl. .................. 405/302.6; 405/16; 405/302.7; 405/258.1; 52/102; 52/DIG. 7; 404/19; 404/35; 404/42
(58) Field of Search .................. 405/16, 302.4, 405/302.6, 302.7; 404/19, 29, 30, 34, 38, 39, 41, 42, 35; 52/102, 311.1, 314, 316, DIG. 7

(56) References Cited

U.S. PATENT DOCUMENTS

| | | | |
|---|---|---|---|
| 3,343,468 A | 9/1967 | Schraudenbach | 404/38 |
| 3,616,103 A | 10/1971 | Greiner et al. | 428/15 |
| 4,111,585 A | 9/1978 | Mascaro | 404/70 |
| 4,154,637 A | 5/1979 | Kasten | 156/276 |
| 4,197,684 A | 4/1980 | Johnson | 52/102 |
| 4,671,699 A | 6/1987 | Roach | 404/41 |
| 5,053,274 A | * 10/1991 | Jonas | 428/332 |
| D329,915 S | 9/1992 | Gutierrez | D25/151 |
| D341,218 S | 11/1993 | Easy | D25/151 |
| 5,826,373 A | 10/1998 | Mrdjenovich | 47/33 |
| 5,884,445 A | * 3/1999 | Woolford | 404/41 |
| 6,171,022 B1 | * 1/2001 | Decker | 405/15 |

FOREIGN PATENT DOCUMENTS

| | | |
|---|---|---|
| EP | 4364 | 10/1979 |
| GB | 2212195 | 7/1989 |
| WO | WO 93/07339 | 4/1993 |

* cited by examiner

*Primary Examiner*—Thomas B. Will
*Assistant Examiner*—Tara L. Mayo
(74) *Attorney, Agent, or Firm*—Richard C. Litman

(57) ABSTRACT

A landscaping tile for stabilizing hillsides that includes a top surface which is textured to simulate a bed of gravel, river rocks, or the like. The landscaping tile is flexible and conforms to the topography of the land. The landscaping tile is secured to the ground using a plurality of stakes. The stakes may be driven through preformed holes defined directly in the tile, or through a border frame which overlaps the tile.

6 Claims, 7 Drawing Sheets

LANDSCAPING TILE

CROSS-REFERENCE TO RELATED APPLICATION

This application claims the benefit of U.S. Provisional Patent Application Ser. No. 60/211,376, filed Jun. 14, 2000.

BACKGROUND OF THE INVENTION

1. Field of the Invention

The present invention relates to landscaping tile for stabilizing the soil against erosion while preventing the growth of unwanted vegetation.

2. Description of Related Art

Hillsides that become overgrown with weeds are hazardous to mow or trim because maneuvering a mower or tractor on a sloping hillside entails an increased risk of accident due, for example, to the tractor tipping over or the operator of a mower falling and losing control of the mower. Using herbicides to control the weeds would completely eliminate the roots that hold the soil together and prevent erosion of the soil due to wind and rain. Using natural rocks to cover a hillside is laborious and expensive. Although landscaping tiles have been proposed in the art as illustrated by the references cited below, none of the cited references provide an inexpensive and easily installed landscaping tile which stabilizes the soil against erosion while preventing the growth of unwanted vegetation. Therefore, the need persists in the art for an inexpensive and easily installed landscaping tile which stabilizes the soil against erosion and prevents the growth of unwanted vegetation.

U.S. Pat. No. 5,826,373, issued to Frances D. Mrdjenovich on Oct. 27, 1998, is directed to artificial landscaping boulders that are hollow. The artificial boulder of Mrdjenovich is designed to hold a potted plant and is not suitable for covering a hillside inexpensively and easily.

U.S. Pat. No. 4,671,699, issued to Edward F. Roach on Jun. 9, 1987, is directed to a perforated paving tile that does not choke grass.

U.S. Pat. No. 4,197,684, issued to Merlyn B. Johnson on Apr. 15, 1980, is directed to an assembly including spaced apart simulated rocks which are joined together by special connectors. The assembly of Johnson is not intended to prevent the growth of vegetation, but is intended to facilitate temporary removal of simulated rocks to allow the ground under the rocks to be mowed.

U.S. Pat. No. 4,154,637, issued to Walter Kasten on May 15, 1979, is directed to a landscaping blanket formed by encapsulating rocks between two membranes.

U.S. Pat. No. 4,111,585, issued to Thomas C. Mascaro on Sep. 5, 1978, is directed to a modular support for turf and sod.

U.S. Pat. No. 3,616,103, issued to Greiner et al. on Oct. 26, 1971, is directed to a hard cementitious sheet having a simulated stone surface.

U.S. Pat. No. 3,343,468, issued to Paul Schraudenbach on Sep. 26, 1967, and U.S. Pat. No. Des. 341,218, issued to Kimberley Anne Easy on November 9, 1993, show paving blocks with textured surfaces. U.S. Pat. No. Des. 329,915, issued to Patrick Gutierrez on Sep. 29, 1992, shows a patio block having a surface with a plurality of hemispherical projections.

International Application Number WO 93/07339, published Apr. 15, 1993, and European Patent Application Number 0 004 364, published Oct. 3, 1979, show assemblies of connected paving blocks. U.K. Patent Application Number 2 212 195, published Jul. 19, 1989, shows an array of interconnected blocks used for soil stabilization.

None of the above inventions and patents, taken either singly or in combination, is seen to describe the instant invention as claimed.

SUMMARY OF THE INVENTION

The present invention is directed to a landscaping tile for stabilizing hillsides. The landscaping tile includes a top surface which is textured to simulate a bed of gravel, river rocks, or the like. The landscaping tile is flexible and conforms to the topography of the land. The landscaping tile is secured to the ground using a plurality of stakes. The stakes may be driven through preformed holes defined directly in the tile, or through a border frame which overlaps the tile. The landscaping tile helps prevent soil erosion while at the same time preventing the growth of undesirable weeds and other vegetation.

Accordingly, it is a principal object of the invention to provide a landscaping tile that can reduce soil erosion while preventing the growth of undesirable vegetation.

It is another object of the invention to provide a landscaping tile that has an aesthetically pleasing appearance.

It is a further object of the invention to provide a landscaping tile that reduces the necessity for weeding a hillside or patch of ground.

Still another object of the invention is to provide a landscaping tile that is easy to install, maintain, and remove.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
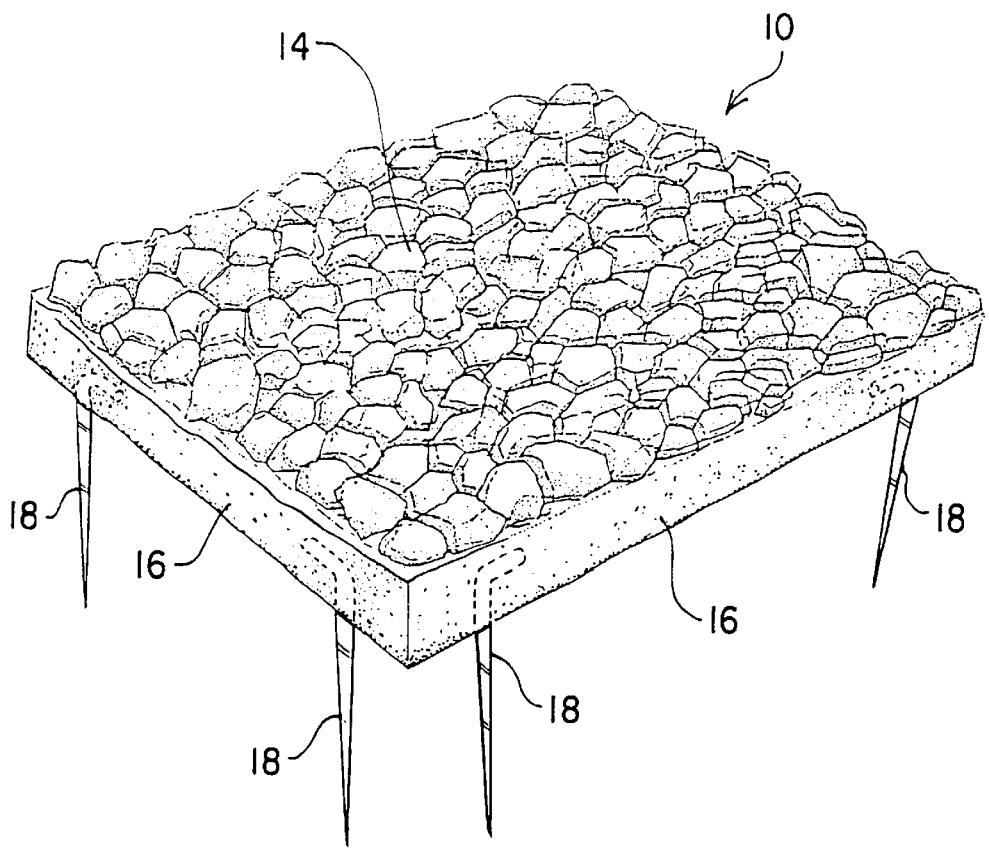
FIG. 1 is a perspective view of a landscaping tile according to the present invention.
Figure 2:
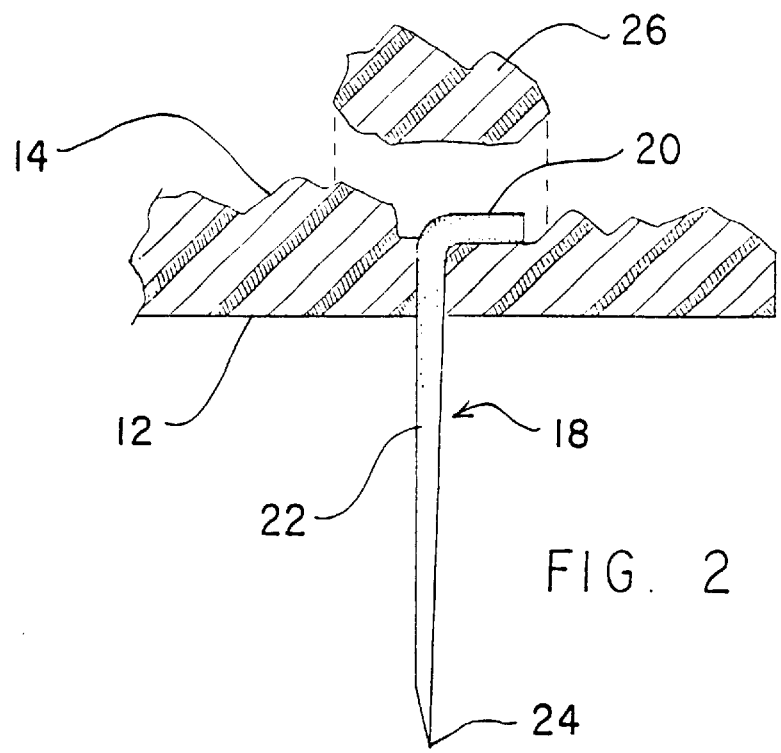
FIG. 2 is a fragmentary view illustrating the installation of the landscaping tile made in accordance to the present invention.
Figure 3:
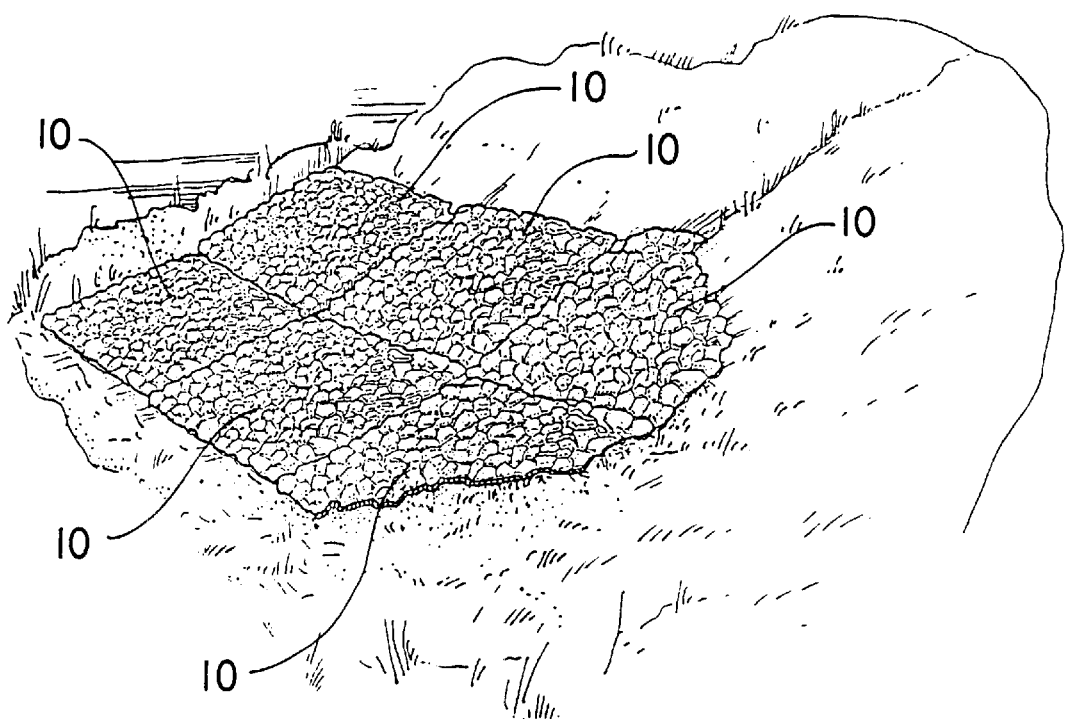
FIG. 3 is an environmental view showing the landscaping tile of the present invention being used to cover a hillside.

Referring to FIGS. 1–3, the present invention is directed to a landscaping tile 10. The landscaping tile 10 is in the form of a sheet having an essentially featureless bottom surface 12 and a decorative top surface 14. The decorative top surface 14 is textured to resemble or simulate a plurality of densely packed rocks evenly distributed over an area. The plurality of densely packed rocks simulated by the decorative top surface 14 should resemble a bed of rocks, therefore the plurality of densely packed rocks simulated by the decorative top surface 14 should appear to include rocks which are piled atop other rocks. Preferably, the decorative top surface 14 should resemble a bed of large sized gravel or "river rocks."

In the embodiments shown in FIGS. 1–4, the decorative top surface 14 is spaced apart from the bottom surface 12, and the decorative top surface 14 extends over an area which generally parallels the bottom surface 12. The decorative top surface 14 is superimposed upon the bottom surface 12 when the landscaping tile 10 is viewed from above (i.e. when viewed in plan view). A plurality of lateral sides 16 extend between the decorative top surface 14 and the bottom surface 12. The plurality of sides 16 laterally bound the landscaping tile 10 when the landscaping tile 10 is viewed in plan view. In other words, the plurality of sides 16 define the perimeter of the landscaping tile 10 when the landscaping tile 10 is viewed from above.

The landscaping tile 10 in the embodiments shown in FIGS. 1–4 is made of a flexible material such that when the landscaping tile 10 is placed upon a supporting surface, the landscaping tile 10 will conform to the topography of the supporting surface. Preferably, the landscaping tile 10 is made in one piece from a molded, flexible plastic or rubber material. Alternatively, the landscaping tile 10 may be fabricated in rolled sheets and the simulated rock bed pattern impressed onto one side of the rolled sheet.

Examples of suitable materials for the landscaping tile 10 shown in FIGS. 1–4 include foam rubber (e.g. neoprene), silicone rubber, and flexible plastic materials, such as polyvinyl chloride. The molded foam rubbers may have a spongiform interior, however, the molding process generally provides the molded article with a thin solid skin which can be molded to have a surface texture resembling that of rocks, gravel, and the like. If the material used in making the tile 10 has a spongiform surface, then it may be provided with a solid skin, capable of being textured, by dipping the spongiform material in a liquid rubber and then allowing the rubber to cure and/or solidify. Also, as an alternative to a one piece construction, the landscaping tile 10 may be made from multiple layers, with the topmost layer having the simulated bed of rocks formed thereon.

The landscaping tile 10 will commercially be supplied in rectangular sheets which may vary in size between fifteen inches by fifteen inches, up to fifteen feet by fifteen feet. As an example, the landscaping tile 10 may be supplied in 15 ft. by 15 ft. square sheets. The landscaping tile 10 may be cut to any desired size an shape using ordinary cutting tools.

In use, the landscaping tile 10 shown in FIGS. 1–3 is placed over a patch of ground which a user desires to cover with the tile 10. Then, the landscaping tile 10 is secured to the ground by driving a plurality of stakes 18 through the tile 10 and into the ground. The head 20 of each stake 18 catches the tile 10 and holds the tile securely to the ground. Each of the stakes 18 has a shaft 22 which has a relatively sharp penetrating end 24 at one end and a head 20 at the other end. In the illustrated example, the stake head 20 is formed by a portion of the stake which is bent at a right angle relative to the stake shaft 22. However, any well known type of stake may be used with the present invention. For example, the stake 18 may have a flat or rounded head which projects from all around the non-penetrating end of the stake shaft 22. The preferred stakes 18 will be about eighteen inches long.

To preserve the aesthetic appeal of the tile 10, prior to driving a stake 18 through the tile 10, a piece 26 is preferably carved from the decorative top surface 14 using an ordinary cutting tool. The stake 18 is then driven through the tile 10 at the position from which the piece 26 was removed. The piece 26 is then cemented or glued back into its original position, while maintaining its original orientation (i.e. with the decorative side of the piece 26 facing upward), to thus preserve the outward appearance of the tile 10.

Referring to FIG. 3, several landscaping tiles 10 can be seen covering a hillside. The landscaping tiles 10 block sunlight and prevent sunlight from reaching the surface of the hillside. Thus, the landscaping tiles 10 prevent the growth of vegetation on the hillside and obviate the need for trimming or mowing the hill side. By covering the hillside, the tiles 10 also prevent or greatly reduce the erosion of the soil on the hillside due to the actions of wind and rain.

Figure 4:
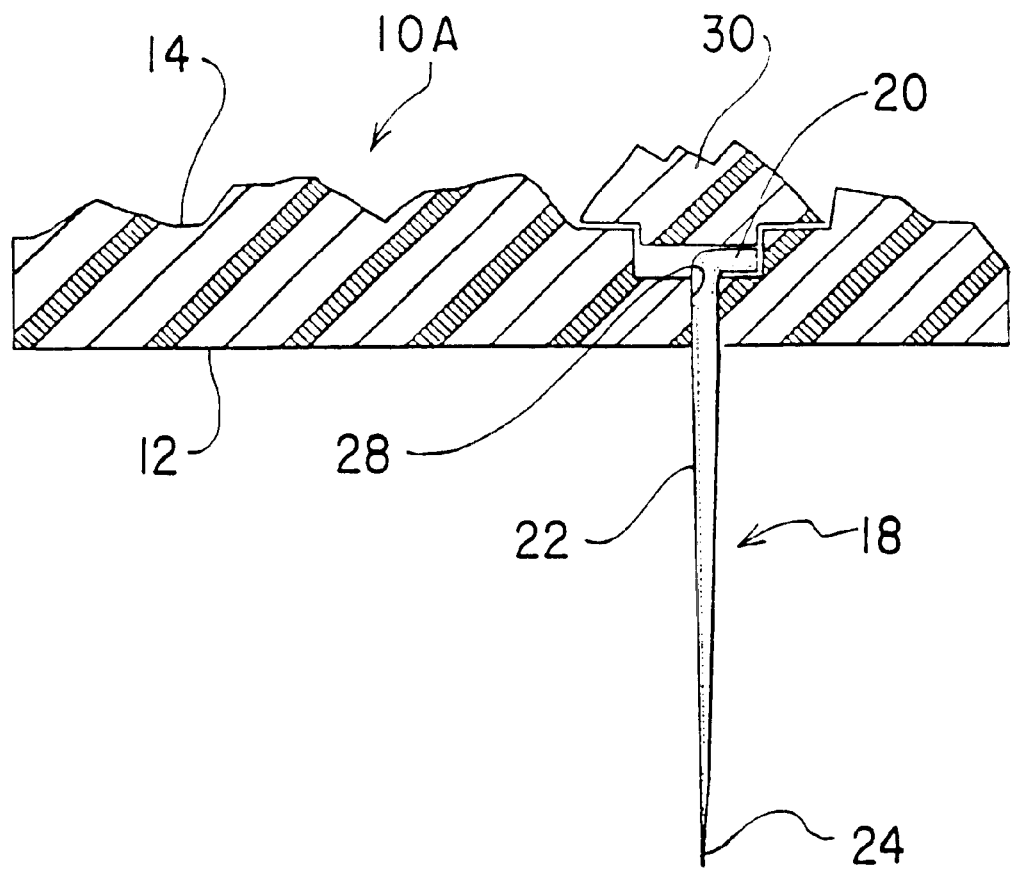
FIG. 4 is a fragmentary view showing a second embodiment of the landscaping tile of the present invention having counter-sunk holes for the stakes and decorative covers for the counter-sunk holes.

Referring to FIG. 4, a second embodiment 10A of the landscaping tile of the present invention can be seen. The landscaping tile 10A differs from the landscaping tile 10 mainly in that the landscaping tile 10A has a plurality of counter-sunk holes 28 preformed therein. The counter-sunk holes 28 are adapted for allowing a plurality of the stakes 18 to extend through the landscaping tile 10A in order to secure the landscaping tile 10A to the ground. The landscaping tile 10A further includes a plurality of decorative caps 30 which are adapted to cover the plurality of counter-sunk holes 28 after stakes 18 have been driven through the holes 28. The decorative caps 30 have top surfaces that match the decorative top surface 14 in appearance.

Figure 5:
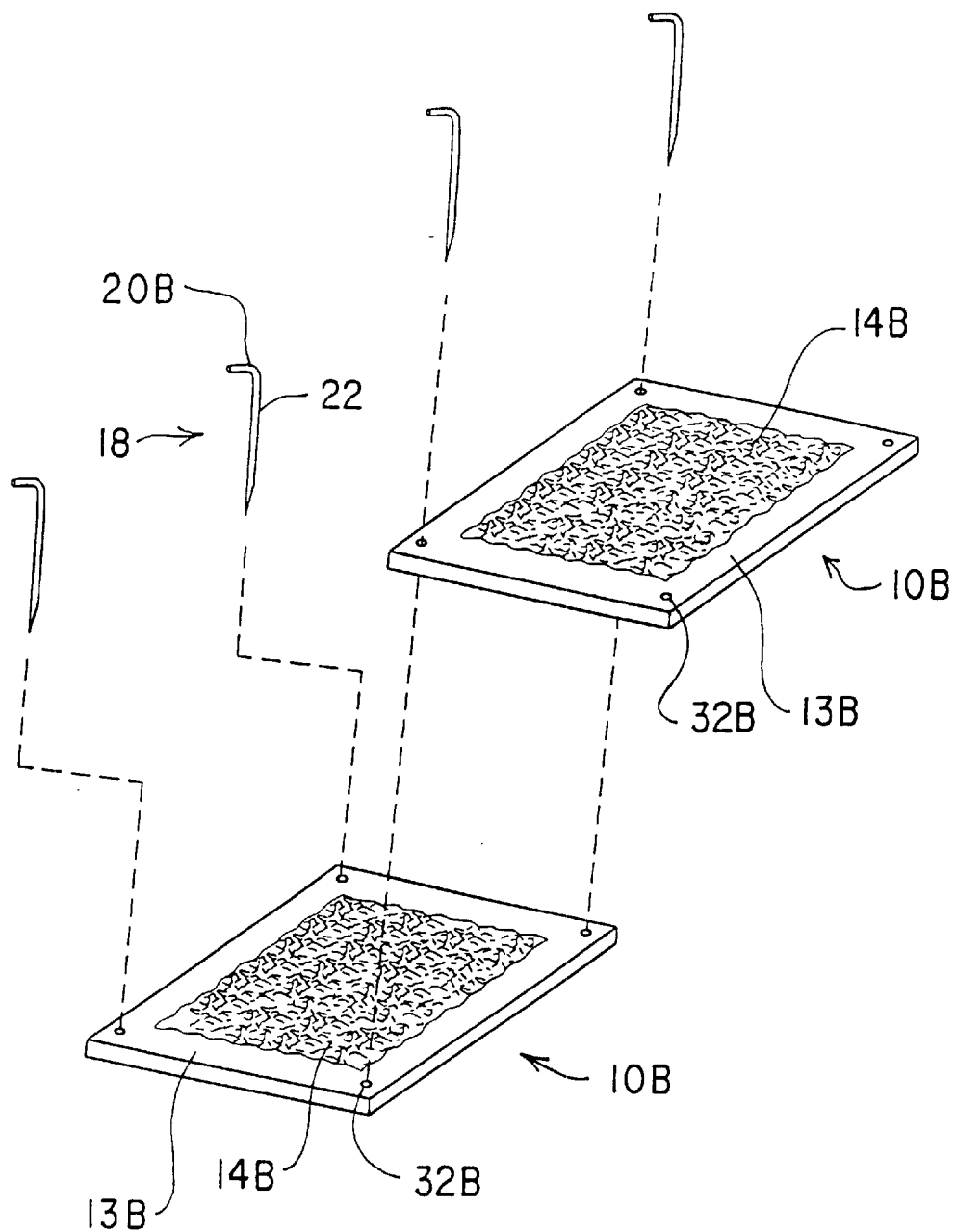
FIG. 5 is an exploded view of a third, and preferred, embodiment of the landscaping tile made in accordance to the present invention.
Figure 6:
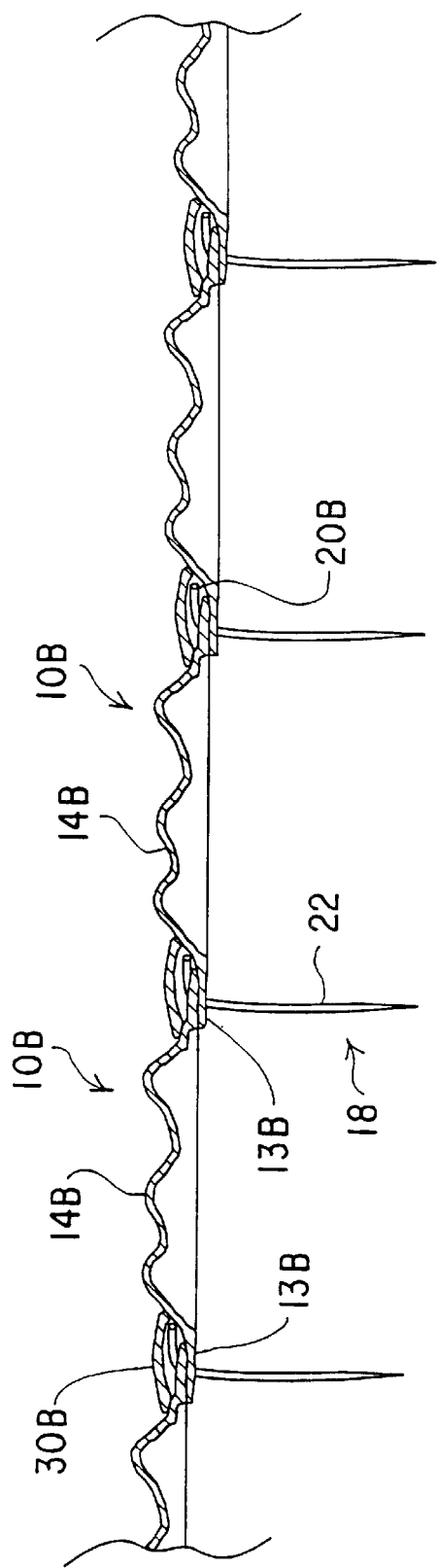
FIG. 6 is a section view of the third embodiment of the landscaping tile made in accordance to the present invention.

Referring to FIGS. 5 and 6, a third embodiment of the landscaping tile, referenced as 10B is illustrated. As shown in FIG. 5, in this embodiment the landscaping tile 10B is formed in rectangular sheets which include a centrally disposed decorative top surface 14B surrounded by an essentially flat, planar border 13B or rim about the periphery of the tile 10B. As seen more clearly in FIG. 6, the bottom surface 12B (and consequently the centrally disposed top surface 14B) is noncoplanar with the border 13B and is raised above the border 13B in a generally dome-shaped fashion. This configuration has the advantage of being easier to install and conform to uneven or bumpy ground. In this embodiment, the landscaping tile 10B may also be made from foam rubber (e.g. neoprene), silicone rubber, or flexible plastic materials, such as polyvinyl chloride. However, in this embodiment the materials used may be either more resilient or more semi-rigid than flexible so that the decorative, centrally disposed top surface 14B maintains its elevation or dome-shaped structure if the tiles 10B are stacked on top of each other during storage. In this embodiment the landscaping tiles 10B must be made in predetermined sizes, as the tiles 10B may not be custom cut to size due to the necessity of maintaining the integrity of the border 13B. The tiles 10B may be furnished in a variety of sizes ranging in size, e.g., from fifteen inches by fifteen inches up to about fifteen feet by fifteen feet.

As shown in FIGS. 5 and 6, the landscaping tiles 10B are installed by assembling the border 13B of one tile 10B over the border 13B of a second tile 10B in overlapping fashion and driving stakes 18 through the overlapping borders 13B and into the ground. As shown in FIG. 6, a plurality of decorative caps 30B or cover strips may be placed between adjacent tiles 10B and secured by adhesive or other means in order to cover the heads 20B of the stakes 18 and the exposed portions of the borders 13B. At the outside edges of each group of landscaping tiles 10B, a decorative cap 30B may be attached to the single border 13B to cover the outside edges of the group. Another advantage of the foregoing construction is that the landscaping tiles 10B may be made with preformed holes 32B in the borders 13B which are sized and dimensioned to receive the shaft 22 of the stake 18. Since the decorative top surface is elevated above the borders 13B, countersinking of the holes 32B is unnecessary. The preformed holes 32B reduce or eliminate the possibility of tearing or cracking the tiles 10B during insertion of the stakes 18.

Figure 7:
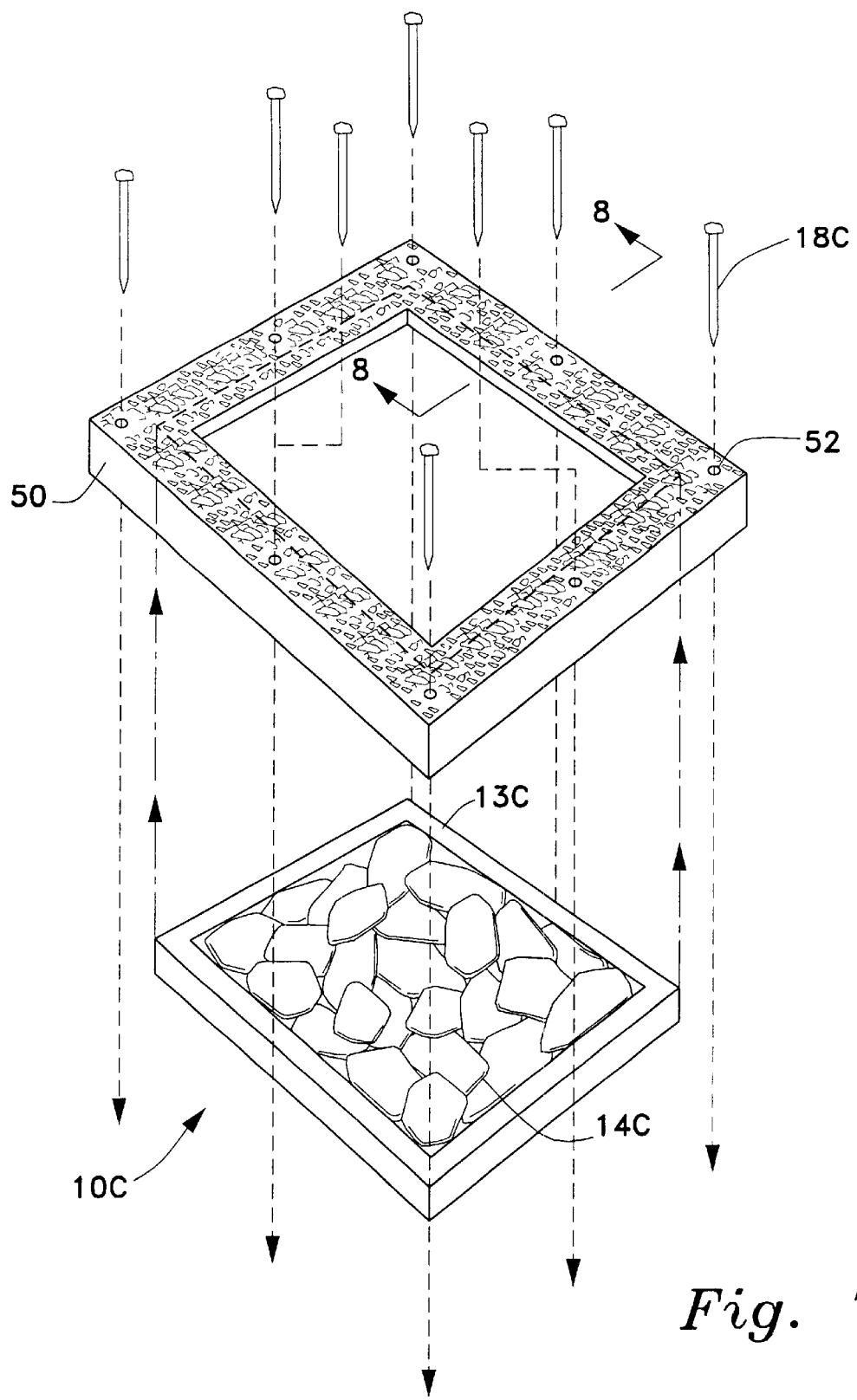
FIG. 7 is an exploded view of a fourth embodiment of the landscaping tile made in accordance to the present invention.
Figure 8:
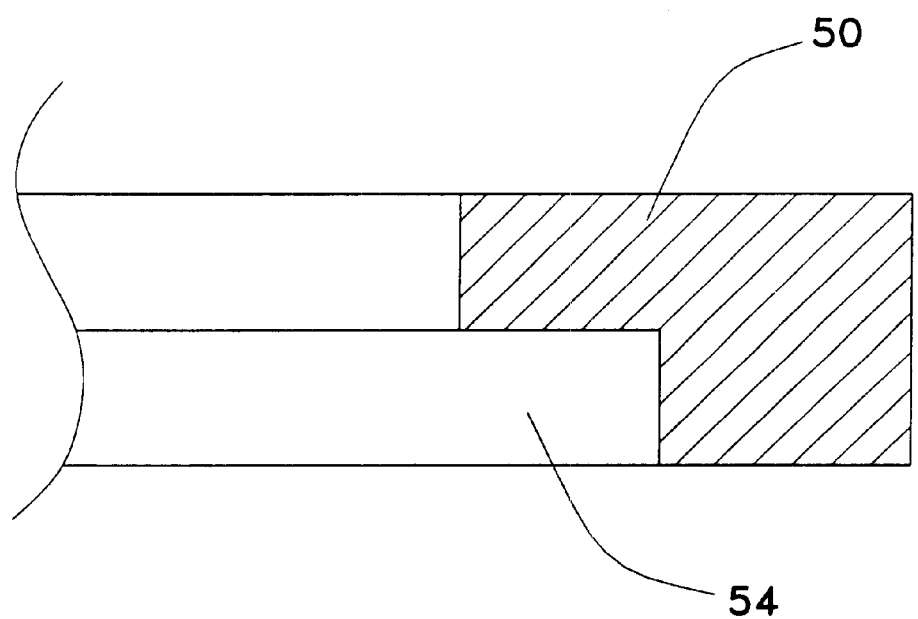
FIG. 8 is a section view through the lines 8—8 of FIG. 7.

FIG. 7 shows a fourth embodiment of a landscaping tile 10C. In this embodiment the landscaping tile 10C is formed in rectangular sheets which include a centrally disposed decorative top surface 14C surrounded by an essentially flat, planar border 13C or rim about the periphery of the tile 10C. However, in this embodiment the landscaping tile 10C is secured to the ground by driving a plurality of stakes 18C through a frame 50 which overlaps the tile 10C. The top surface of the frame 50 has a decorative finish, such as small rocks, for aesthetic effect about as rectangular opening sized and dimensioned for exposing the centrally disposed decorative top surface 14C of the landscaping tile 10C. The frame 50 has a plurality of pre-formed holes 52 defined about its periphery for accommodating the shaft of the stakes 18C. The head of the stakes 18C may have a decorative, rock shaped appearance for aesthetic effect. The bottom surface of the frame 50 may have a rectangular recess 54 defined therein (indicated in shadow in FIG. 7 and shown in the section view of FIG. 8) for receiving the border 13C of the tile 10C in order to prevent the tile 10C from shifting position beneath the frame 50 as a result of shearing forces. In this embodiment, the landscaping tile 10C and the frame 50 may be made from foam rubber (e.g. neoprene), silicone rubber, or flexible plastic materials, such as polyvinyl chloride.

It is to be understood that the present invention is not limited to the embodiments described above, but encompasses any and all embodiments within the scope of the following claims.

I claim:

1. A landscaping tile system for covering a landscape, comprising:
    a) a plurality of landscaping tiles, each tile being a one-piece rectangular sheet having:
        i) a decorative top surface simulating a plurality of densely packed rocks evenly distributed over an area;
        ii) a flat, planar border disposed about the periphery of the rectangular sheet, said decorative top surface being centrally disposed within said border; and
        iii) a bottom surface underlying said decorative top surface, the bottom surface being noncoplanar with said border and raised above said border in a substantially dome-shaped fashion; and
    b) a plurality of stakes, each stake having a head, a shaft and a pointed tip end, the stakes securing said landscaping tiles to a supporting surface further comprising a plurality of decorative caps, each decorative cap being attached to a pair of said landscaping tiles placed adjacent to each other with said borders overlapping and secured to a landscape by said plurality of stakes, the decorative caps covering the overlapping borders and the heads of the stakes between adjoining landscaping tiles and blending the top surfaces of the pair of adjacent landscaping tiles.

2. The landscaping tile system according to claim 1, where said border has a plurality of holes defined therein sized and dimensioned for receiving the shaft of said stakes used to secure the landscaping tile to a landscape.

3. The landscaping tile system according to claim 1, wherein said landscaping tiles are made of a material selected from the group consisting of foam rubber, silicone rubber and polyvinyl chloride.

4. A landscaping tile system for covering a landscape comprising:
    a) a plurality of landscaping tiles, each tile being a one-piece rectangular sheet having:
        i) a decorative top surface simulating a plurality of densely packed rocks evenly distributed over an area;
        ii) a flat, planar border disposed about the periphery of the rectangular sheet, said decorative top surface being centrally disposed within said border; and
        iii) a bottom surface underlying said decorative top surface, the bottom surface being noncoplanar with said border and raised above said border in a substantially dome-shaped fashion; and a rectangular frame having a central rectangular opening defined therein, the frame being placed over said landscaping tile with the frame overlapping the border of said landscaping tile,
    b) a plurality of stakes, each stake having a head, a shaft and a pointed tip end, the stakes securing said landscaping tiles to a supporting surface said plurality of spikes being driven through said frames.

5. The landscaping tile system according to claim 4, wherein said frame has a plurality of preformed holes defined therein, said plurality of spikes being driven through said plurality of preformed holes.

6. The landscaping tile system according to claim 4, wherein said frame has a recess defined therein about the rectangular opening, the recess being sized and dimensioned for receiving the border of said landscaping tile in order to prevent said landscaping tile from shifting position when impacted by a shearing force.

* * * * *